United States Patent
Sueoka et al.

(10) Patent No.: US 9,297,587 B2
(45) Date of Patent: Mar. 29, 2016

(54) METHOD FOR MANUFACTURING A HEAT EXCHANGER

(75) Inventors: Takahisa Sueoka, Osaka (JP); Hirohiko Matsushita, Osaka (JP); Shuuji Ikegami, Osaka (JP); Lan Jiang, Osaka (JP)

(73) Assignee: DAIKIN INDUSTRIES, LTD., Osaka-shi (JP)

( * ) Notice: Subject to any disclaimer, the term of this patent is extended or adjusted under 35 U.S.C. 154(b) by 683 days.

(21) Appl. No.: 13/321,280

(22) PCT Filed: May 17, 2010

(86) PCT No.: PCT/JP2010/003317
§ 371 (c)(1),
(2), (4) Date: Nov. 18, 2011

(87) PCT Pub. No.: WO2010/134315
PCT Pub. Date: Nov. 25, 2010

(65) Prior Publication Data
US 2012/0067555 A1 Mar. 22, 2012

(30) Foreign Application Priority Data
May 21, 2009 (JP) .................. 2009-123403

(51) Int. Cl.
*B23P 15/26* (2006.01)
*F28D 1/047* (2006.01)
(Continued)

(52) U.S. Cl.
CPC ............ *F28D 1/0477* (2013.01); *B01D 53/261* (2013.01); *B01D 53/28* (2013.01);
(Continued)

(58) Field of Classification Search
CPC ......... B23P 15/26; F28F 13/185; F28F 13/18; F28F 2245/02; F28F 1/32; B01D 2253/202; B01D 53/28; B01D 53/261; Y10T 29/4935; F24F 3/1429; F24F 3/1411; B01J 20/3268; B01J 20/3214; B01J 20/3042; B01J 20/28004; B01J 20/26; F28D 1/0477
USPC ........................................ 29/890.03; 165/133
See application file for complete search history.

(56) References Cited

U.S. PATENT DOCUMENTS 2,632,002 A * 3/1953 Gross ............................. 564/1.5
7,537,050 B2 * 5/2009 Ikegami et al. ............... 165/133
(Continued)

FOREIGN PATENT DOCUMENTS

JP 9-176998 A 7/1997
JP 10-286460 A 10/1998
(Continued)

OTHER PUBLICATIONS

English Machine Translation of JP 2007-245025 A.*
(Continued)

*Primary Examiner* — Sarang Afzali
(74) *Attorney, Agent, or Firm* — Birch, Stewart, Kolasch & Birch, LLP

(57) ABSTRACT

In an adsorption heat exchanger, adsorbent expanded by absorbing moisture and contracted by dissipating moisture is supported on a surface of a heat exchanger body. An adsorbent layer containing the adsorbent is formed on the surface of the heat exchanger body by applying slurry containing the adsorbent in a contracted state to the surface of the heat exchanger body and drying the slurry. A solvent of the slurry contains alcohol as a main component.

2 Claims, 11 Drawing Sheets

(51) Int. Cl.
- *F28F 13/18* (2006.01)
- *B01D 53/26* (2006.01)
- *B01D 53/28* (2006.01)
- *B01J 20/26* (2006.01)
- *B01J 20/28* (2006.01)
- *B01J 20/30* (2006.01)
- *B01J 20/32* (2006.01)
- *F24F 3/14* (2006.01)
- *F28F 1/32* (2006.01)

(52) U.S. Cl.
CPC ........... *B01J 20/26* (2013.01); *B01J 20/28004* (2013.01); *B01J 20/3042* (2013.01); *B01J 20/3214* (2013.01); *B01J 20/3268* (2013.01); *B23P 15/26* (2013.01); *F24F 3/1411* (2013.01); *F24F 3/1429* (2013.01); *F28F 1/32* (2013.01); *F28F 13/18* (2013.01); *B01D 2253/202* (2013.01); *F28F 2245/02* (2013.01); *Y10T 29/4935* (2015.01)

(56) References Cited

U.S. PATENT DOCUMENTS

| | | | |
|---|---|---|---|
| 7,704,305 B2* | 4/2010 | Nishida | 96/154 |
| 7,717,163 B2* | 5/2010 | Matsushita et al. | 165/133 |
| 2007/0204979 A1* | 9/2007 | Matsushita et al. | 165/151 |
| 2008/0093059 A1 | 4/2008 | Nishida | |

FOREIGN PATENT DOCUMENTS

| | | |
|---|---|---|
| JP | 2004-311345 A | 11/2004 |
| JP | 2005-283061 A | 10/2005 |
| JP | 2006-200850 A | 8/2006 |
| JP | 2007-132614 A | 5/2007 |
| JP | 2007-190546 A | 8/2007 |
| JP | 2007-216109 A | 8/2007 |
| JP | 2007-224220 A | 9/2007 |
| JP | 2007-245025 A | 9/2007 |
| JP | 2008-157498 A | 7/2008 |
| WO | WO 2005/095882 A1 | 10/2005 |
| WO | WO 2006/077672 A1 | 7/2006 |

OTHER PUBLICATIONS

International Search Report, dated Jul. 27, 2010, cited in PCT/JP2010/003317.
Written Opinion, dated Jul. 27, 2010, cited in PCT/JP2010/003317.
English-language Machine Translation of JP-2004-311345-A published Nov. 4, 2004.

* cited by examiner

FIG.5
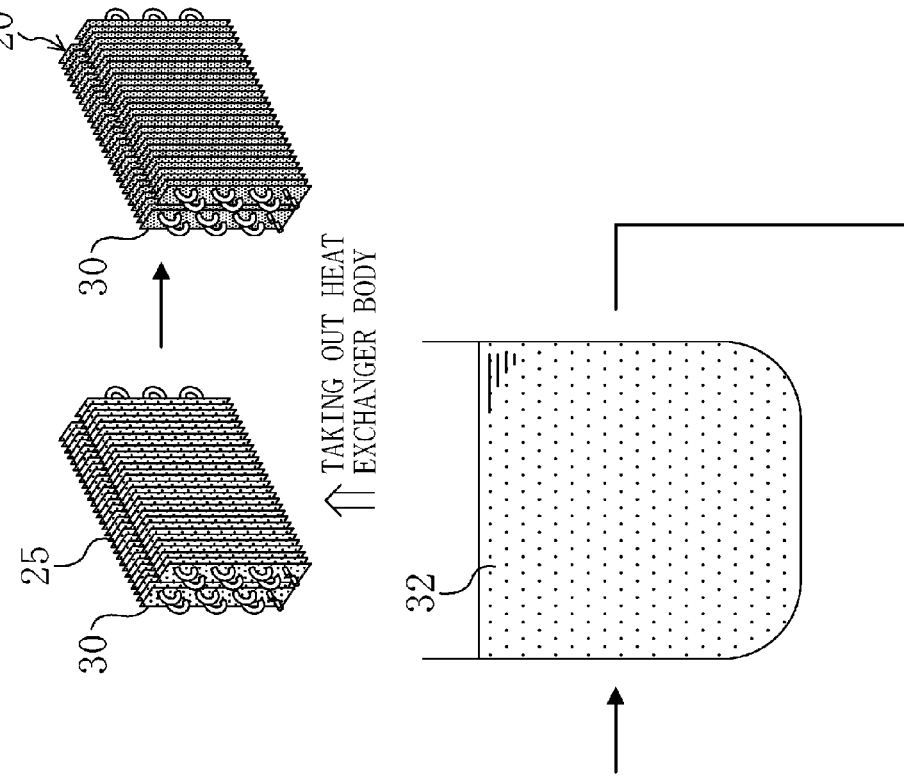
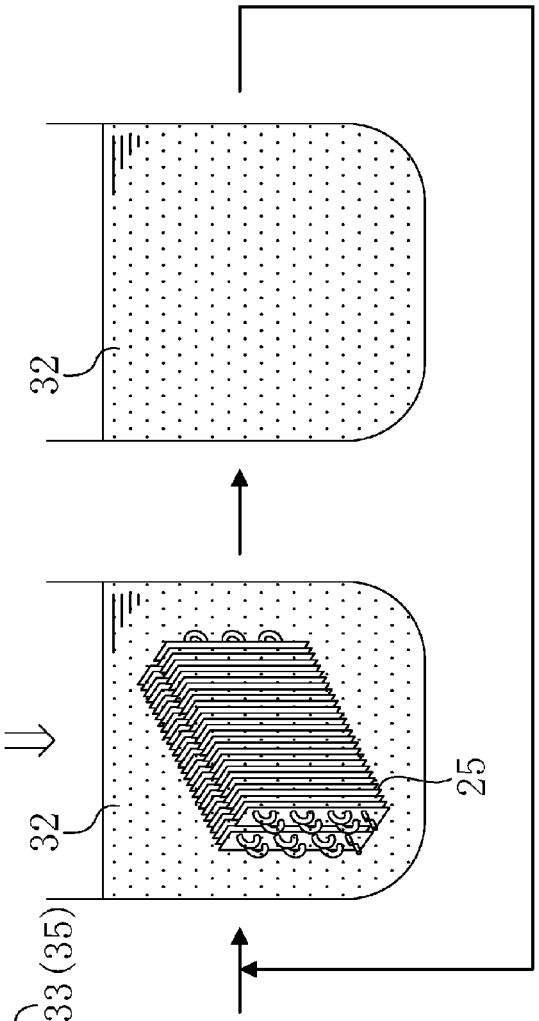

FIG.9

| WATER MIXING RATIO | CRACKING | SLURRY DISPERSIBILITY |
|---|---|---|
| 5 PARTS BY MASS | NOT FOUND | BAD |
| 10 PARTS BY MASS | NOT FOUND | NOT GOOD |
| 20 PARTS BY MASS | NOT FOUND | GOOD |
| 30 PARTS BY MASS | NOT FOUND | GOOD |
| 40 PARTS BY MASS | NOT FOUND | GOOD |
| 50 PARTS BY MASS | SLIGHTLY FOUND | GOOD |
| 60 PARTS BY MASS | FOUND | GOOD |
| 70 PARTS BY MASS | FOUND | GOOD | ant layer (30) is formed, in which the adsorbent (31) is uniformly dispersed.

METHOD FOR MANUFACTURING A HEAT EXCHANGER

TECHNICAL FIELD

The present invention relates to a heat exchanger and a method for manufacturing the heat exchanger, and particularly relates to a heat exchanger on which adsorbent is supported and a method for manufacturing the heat exchanger.

BACKGROUND ART

Conventionally, an adsorption heat exchanger has been known, which includes a heat exchanger body for exchanging heat between a heat medium such as refrigerant and air, and an adsorbent layer formed on a surface of the heat exchanger body. The adsorption heat exchanger of this type is disclosed in, e.g., Patent Documents 1 and 2.

The adsorbent layer of the adsorption heat exchanger contains adsorbent absorbing moisture from air and dissipating moisture to air. As the adsorbent, inorganic material such as silica gel and zeolite, organic material having a hygroscopic property, etc. are used. In the adsorption heat exchanger disclosed in Patent Documents 1 and 2, the adsorbent is used, which is made of organic high-polymer material and which adsorbs and absorbs water vapor.

In the adsorbent disclosed in Patent Documents 1 and 2, a plurality of high-polymer main chains having hydrophilic polar groups are cross-linked to each other, and the plurality of high-polymer main chains cross-linked to each other form a three-dimensional structure. In the adsorbent, both of a phenomenon in which water vapor is adsorbed to the hydrophilic polar groups and a phenomenon in which water vapor is absorbed by the three-dimensional structure including the high-polymer main chains are occurred. As a result, the adsorbent traps a larger amount of water vapor as compared to, e.g., zeolite only adsorbing water vapor to a surface thereof.

A method for applying a mixture of powder having fine adsorbent particles and a solvent to the heat exchanger body and then forming the adsorbent layer on the surface of the heat exchanger body by evaporating the solvent is disclosed in paragraph 0055 of Patent Document 1 and paragraph 0053 of Patent Document 2.

CITATION LIST

Patent Document

PATENT DOCUMENT 1: International Publication No. 2006/077672

PATENT DOCUMENT 2: Japanese Patent Publication No. 2007-132614

SUMMARY OF THE INVENTION

Technical Problem

However, adsorbent deformation, i.e., expansion and contraction of adsorbent particles in a process for forming an adsorbent layer has not taken into consideration for the conventional adsorption heat exchanger. As a result, there is a problem that cracking etc. of the adsorbent layer is caused.

That is, in the conventional adsorption heat exchanger, slurry foamed by mixing the adsorbent and the solvent together is applied and dried to form the adsorbent layer, and water is mainly used as the solvent of the slurry. Since water is used as the solvent, the adsorbent particles temporarily expanded by absorbing water is contracted at a drying step. Thus, there is a problem that the adsorbent is peeled off due to the cracking. In addition, there is another problem that non-uniform coating is caused due to the contraction of the adsorbent particles, thereby causing variation in performance. Further, there is still another problem that binder coverage which is coverage of the adsorbent by a binder is increased, thereby degrading a water absorption performance.

Since the adsorbent particles are re-expanded when the slurry is re-applied, there is still another problem that a clearance between fins is narrowed, thereby reducing liquidity and causing clogs. In addition, there is still another problem that the binder cannot withstand the expansion of the adsorbent particles, and, as a result, is peeled off. Further, there is still another problem that the adsorbent absorbs a large amount of water, thereby increasing a drying time.

The present invention has been made in view of the foregoing, and it is an objective of the present invention to form an adsorbent layer in which cracking, variation in performance, etc. are not caused.

Solution to the Problem

In the present invention, an adsorbent layer in which adsorbent is uniformly dispersed is formed without causing adsorbent deformation in a process for forming an adsorbent layer.

That is, over the years, the inventors of the present invention have conducted study on adsorbent in which both of a phenomenon in which water vapor is adsorbed to hydrophilic polar groups and a phenomenon in which water vapor is absorbed by a three-dimensional structure including high-polymer main chains are occurred. The study has shown that, when an adsorbent layer containing the adsorbent is formed, the adsorbent deformation can be reduced by decreasing a water content in slurry.

Specifically, a first aspect of the invention is intended for a heat exchanger in which particles of adsorbent (31) expanded by absorbing moisture and contracted by dissipating moisture are supported on at least a surface of a fin (26) of a heat exchanger body (25). The heat exchanger of the first aspect of the invention includes an adsorbent layer (30) formed so as to contain the adsorbent (31) on the at least the surface of the fin (26) of the heat exchanger body (25) by applying slurry (32) containing the adsorbent (31) in a contracted state to the at least the surface of the fin (26) of the heat exchanger body (25) and drying the slurry (32).

In the first aspect of the invention, the adsorbent layer (30) is formed, in which the adsorbent (31) is uniformly dispersed. In the adsorbent layer (30), cracking or non-uniform coating is not caused.

A second aspect of the invention is intended for the heat exchanger of the first aspect of the invention, in which the slurry (32) includes water-based resin (35) containing a binder (33) and water.

In the second aspect of the invention, a water content in the slurry (32) is decreased, thereby reducing deformation of the adsorbent (31) when the adsorbent layer (30) is formed.

A third aspect of the invention is intended for the heat exchanger of the first or second aspect of the invention, in which the slurry (32) contains water of 10-50 parts by mass for adsorbent (31) of 100 parts by mass.

In the third aspect of the invention, the cracking in the adsorbent layer (30) is reduced. In addition, the binder (33) of the slurry (32) is easily mixed, and therefore the adsorbent layer (30) is formed, in which the adsorbent (31) is uniformly dispersed.

A fourth aspect of the invention is intended for the heat exchanger of the third aspect of the invention, in which the slurry (32) contains water of 20-40 parts by mass for adsorbent (31) of 100 parts by mass.

In the fourth aspect of the invention, the cracking in the adsorbent layer (30) is further reduced. In addition, the binder (33) of the slurry (32) is more easily mixed, and therefore the adsorbent layer (30) is formed, in which the adsorbent (31) is more uniformly dispersed.

A fifth aspect of the invention is intended for the heat exchanger of any one of the first to fourth aspects of the invention, in which a solvent (34) of the slurry (32) contains alcohol as a main component.

In the fifth aspect of the invention, the deformation of the adsorbent (31) when the adsorbent layer (30) is for rued is reduced.

A sixth aspect of the invention is intended for a heat exchanger in which particles of adsorbent (31) expanded by absorbing moisture and contracted by dissipating moisture are supported on at least a surface of a fin (26) of a heat exchanger body (25). The heat exchanger of the sixth aspect of the invention includes an adsorbent layer (30) uniformly mixed with the adsorbent (31) and formed on the at least the surface of the fin (26) of the heat exchanger body (25).

In the sixth aspect of the invention, since the adsorbent (31) of the adsorbent layer (30) is uniformly dispersed, the cracking or the non-uniform coating is not caused in the adsorbent layer (30).

A seventh aspect of the invention is intended for a method for manufacturing a heat exchanger in which particles of adsorbent (31) expanded by absorbing moisture and contracted by dissipating moisture are supported on at least a surface of a fin (26) of a heat exchanger body (25). The method of the seventh aspect of the invention includes the steps of, after preparing slurry (32) containing the adsorbent (31) in a contracted state, applying the slurry (32) to the at least the surface of the fin (26) of the heat exchanger body (25); and drying the slurry (32), thereby forming an adsorbent layer (30) containing the adsorbent (31) on the at least the surface of the fin (26) of the heat exchanger body (25).

In the seventh aspect of the invention, the adsorbent layer (30) is formed, in which the adsorbent (31) is uniformly dispersed. As a result, the adsorbent layer (30) is formed, in which the cracking or the non-uniform coating is not caused.

An eighth aspect of the invention is intended for the method of the seventh aspect of the invention, in which the slurry (32) includes water-based resin (35) containing a binder (33) and water.

In the eighth aspect of the invention, the water content in the slurry (32) is decreased, thereby reducing the deformation of the adsorbent (31) when the adsorbent layer (30) is formed.

A ninth aspect of the invention is intended for the method of the seventh or eighth aspect of the invention, in which the slurry (32) contains water of 10-50 parts by mass for adsorbent (31) of 100 parts by mass.

In the ninth aspect of the invention, the adsorbent layer (30) is formed, in which the cracking is reduced. In addition, the binder (33) of the slurry (32) is easily mixed, and therefore the adsorbent layer (30) is formed, in which the adsorbent (31) is uniformly dispersed.

A tenth aspect of the invention is intended for the method of the ninth aspect of the invention, in which the slurry (32) contains water of 20-40 parts by mass for adsorbent (31) of 100 parts by mass.

In the tenth aspect of the invention, the adsorbent layer (30) is formed, in which the cracking is further reduced. In addition, the binder (33) of the slurry (32) is more easily mixed, and therefore the adsorbent layer (30) is formed, in which the adsorbent (31) is more uniformly dispersed.

An eleventh aspect of the invention is intended for the method of any one of the seventh to tenth aspects of the invention, in which a solvent (34) of the slurry (32) contains alcohol as a main component.

In the eleventh aspect of the invention, the deformation of the adsorbent (31) when the adsorbent layer (30) is formed is reduced.

Advantages of the Invention

According to the first and sixth aspects of the invention, the adsorbent layer (30) without the cracking can be formed. In addition, the adsorbent layer (30) without the non-uniform coating can be formed, and therefore uniformity in hygroscopic performance can be realized across the entirety of the adsorbent layer (30). Further, binder coverage which is coverage of the adsorbent (31) by the binder (33) can be decreased, thereby improving a water absorption performance.

According to the first aspect of the invention, narrowing of a clearance between the fins (26) can be prevented when the adsorbent layer (30) is formed, thereby preventing clogs when the adsorbent layer (30) is formed. In addition, the expansion of the particles of the adsorbent (31) when the adsorbent layer (30) is formed is not caused, thereby ensuring prevention of peeling off of the adsorbent layer (30).

When the slurry (32) is applied, the extra slurry (32) is dispersed and removed by centrifugal force. In such a state, the adsorbent (31) is in the contracted state. Thus, the particles of the adsorbent (31) are light and small, and therefore are less likely to be dispersed. As a result, a mixing ratio of the adsorbent (31) to the adsorbent layer (30) is not decreased, thereby preventing degradation of the hygroscopic performance of the adsorbent layer (30).

In addition, since the particles of the adsorbent (31) are not heavy, the particles of the adsorbent (31) are less likely to be precipitated in the slurry (32), and uniform dispersion of the adsorbent (31) in the slurry (32) can be realized.

According to the second aspect of the invention, the water content in the slurry (32) is decreased, thereby ensuring reduction of the deformation of the adsorbent (31) when the adsorbent layer (30) is formed.

According to the third aspect of the invention, the adsorbent layer (30) is formed, in which the cracking is reduced. In addition, the binder (33) of the slurry (32) is easily mixed, and therefore the adsorbent layer (30) can be formed, in which the adsorbent (31) is uniformly dispersed.

According to the fourth aspect of the invention, the adsorbent layer (30) is formed, in which the cracking is further reduced. In addition, the binder (33) of the slurry (32) is more easily mixed, and therefore the adsorbent layer (30) can be formed, in which the adsorbent (31) is more uniformly dispersed.

According to the fifth aspect of the invention, the reduction of the deformation of the adsorbent (31) when the adsorbent layer (30) is formed can be ensured.

According to the seventh aspect of the invention, the adsorbent layer (30) without the cracking can be formed. In addition, the adsorbent layer (30) without the non-uniform coating can be formed. Thus, the uniformity in hygroscopic performance can be realized across the entirety of the adsorbent layer (30). In addition, the binder coverage which is the coverage of the adsorbent (31) by the binder (33) can be decreased, thereby improving the water absorption performance.

Further, the narrowing of the clearance between the fins (26) can be prevented when the adsorbent layer (30) is formed, thereby preventing the clogs when the adsorbent layer (30) is formed. The expansion of the particles of the adsorbent (31) when the adsorbent layer (30) is formed is not caused, thereby ensuring the prevention of the peeling off of the adsorbent layer (30).

At the step of applying the slurry (32), the extra slurry (32) is dispersed and removed by the centrifugal force. In such a state, the adsorbent (31) is in the contracted state. Thus, the particles of the adsorbent (31) are light and small, and therefore are less likely to be dispersed. As a result, the mixing ratio of the adsorbent (31) to the adsorbent layer (30) is not decreased, thereby preventing the degradation of the hygroscopic performance of the adsorbent layer (30).

Since the particles of the adsorbent (31) are not heavy, the particles of the adsorbent (31) are less likely to he precipitated in the slurry (32), and the uniform dispersion of the adsorbent (31) in the slurry (32) can be realized.

According to the eighth aspect of the invention, the water content in the slurry (32) is decreased, thereby ensuring the reduction of the change in shape of the adsorbent (31) when the adsorbent layer (30) is formed. In addition, since the adsorbent (31) does not absorb a large amount of water, a drying time can be shortened.

According to the ninth aspect of the invention, the adsorbent layer (30) can be formed, in which the cracking is reduced. In addition, the binder (33) of the slurry (32) is easily mixed, and therefore the adsorbent layer (30) can be formed, in which the adsorbent (31) is uniformly dispersed.

According to the tenth aspect of the invention, the adsorbent layer (30) can be formed, in which the cracking is further reduced. In addition, the binder (33) of the slurry (32) is more easily mixed, and therefore the adsorbent layer (30) can be formed, in which the adsorbent (31) is more uniformly dispersed.

According to the eleventh aspect of the invention, the reduction of the change in shape of the adsorbent (31) when the adsorbent layer (30) is formed can be ensured.

BRIEF DESCRIPTION OF THE DRAWINGS

FIG. 1(A) illustrates an operation in a first operation mode. FIG. 1(B) illustrates an operation in a second operation mode.

FIG. 5 is a view illustrating steps of an adsorption heat exchanger manufacturing method.

FIG. 9 is a table illustrating performance evaluation of the slurry of the embodiment and the slurry of the comparative example.

DESCRIPTION OF EMBODIMENTS

An embodiment of the present invention will be described below in detail with reference to the drawings.

<Configuration of Humidity Control Device>

Figure 1:
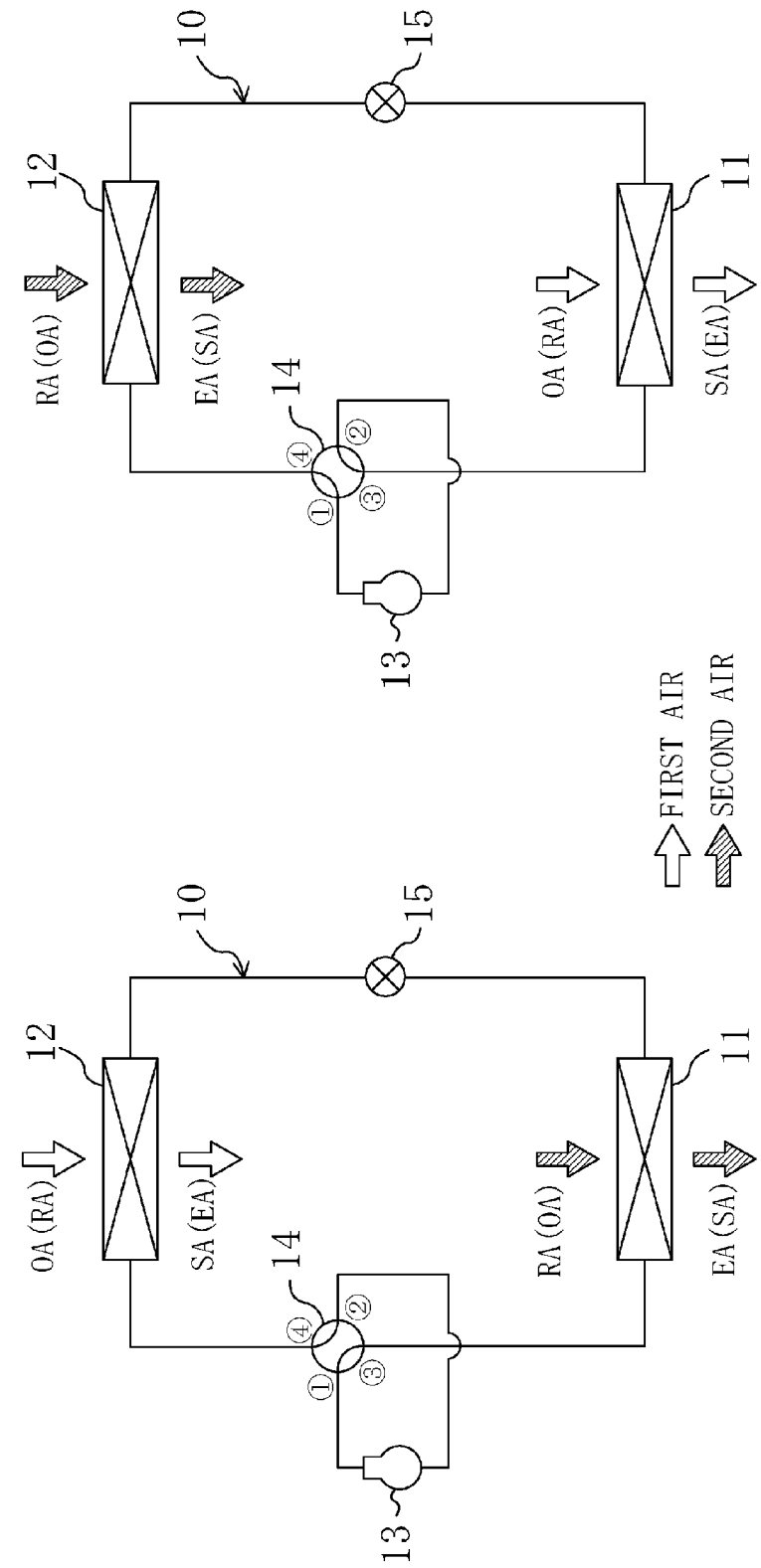
FIG. 1 is a piping system diagram illustrating a configuration of a refrigerant circuit of a humidity control device.

In the present embodiment, an adsorption heat exchanger (20) is provided in a humidity control device as illustrated in FIG. 1. The humidity control device is configured to perform a dehumidification operation in which dehumidified air is supplied to a room and a humidification operation in which humidified air is supplied to the room.

The humidity control device includes a refrigerant circuit (10). The refrigerant circuit (10) is a closed circuit in which a first adsorption member (11), a second adsorption member (12), a compressor (13), a four-way valve (14), and an electric expansion valve (15) are provided, and is filled with refrigerant. In the refrigerant circuit (10), refrigerant circulates to perform a vapor compression refrigeration cycle. Each of the first adsorption member (11) and the second adsorption member (12) is the adsorption heat exchanger (20) of the present invention.

An outlet side of the compressor (13) is connected to a first port of the four-way valve (14), and an inlet side of the compressor (13) is connected to a second port of the four-way valve (14). One end of the first adsorption member (11) is connected to a third port of the four-way valve (14). The other end of the first adsorption member (11) is connected to one end of the second adsorption member (12) through the electric expansion valve (15). The other end of the second adsorption member (12) is connected to a fourth port of the four-way valve (14).

The four-way valve (14) is switchable between a first state (state illustrated in FIG. 1(A)) in which the first port and the third port are communicated with each other, and the second port and the fourth port are communicated with each other; and a second state (state illustrated in FIG. 1(B)) in which the first port and the fourth port are communicated with each other, and the second port and the third port are communicated with each other.

<Configuration of Adsorption Heat Exchanger>

As described above, each of the first adsorption member (11) and the second adsorption member (12) is the adsorption heat exchanger (20). The adsorption heat exchanger (20) will be described with reference to FIGS. 2, 3, and 4.

Figure 2:
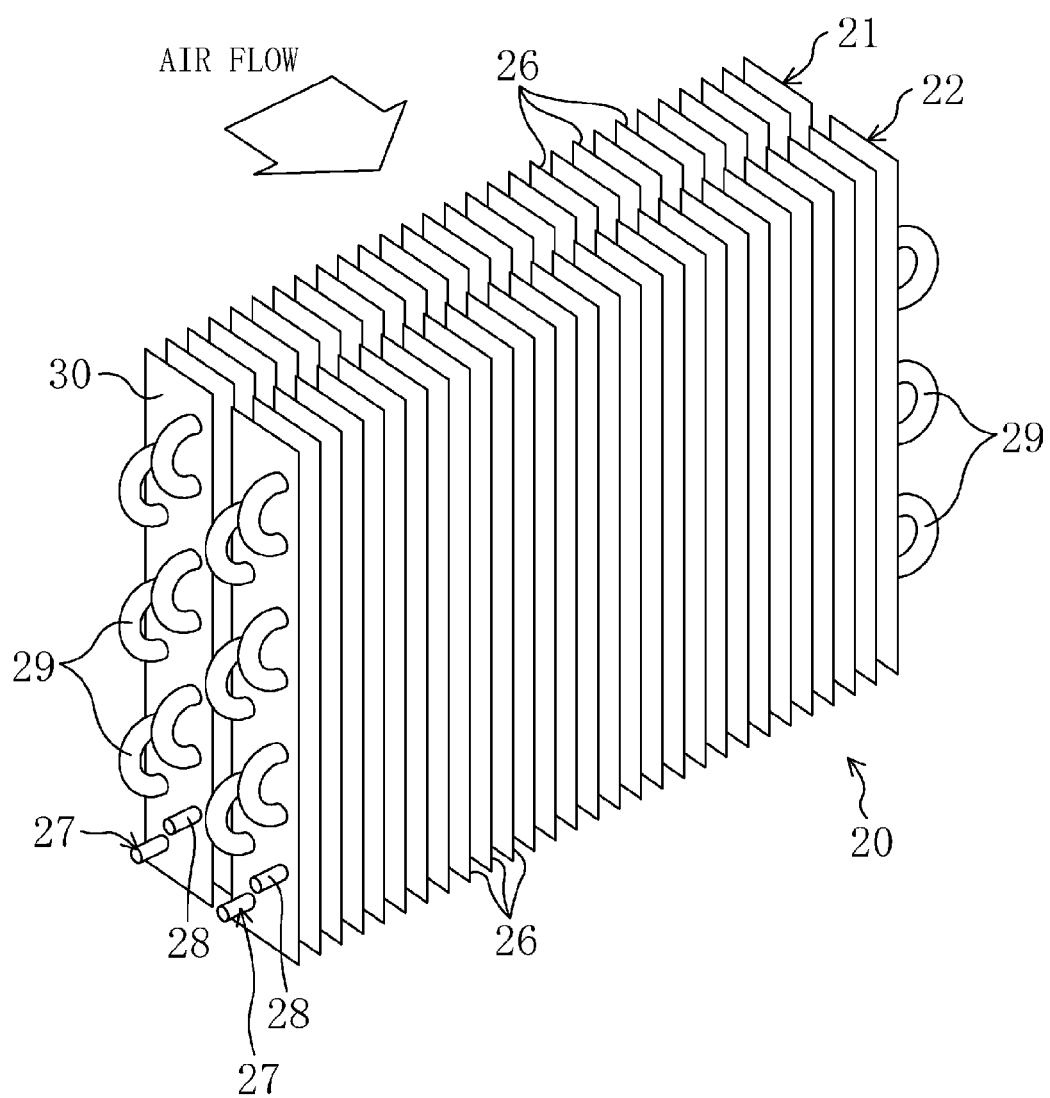
FIG. 2 is a schematic perspective view of an adsorption heat exchanger.
Figure 3:
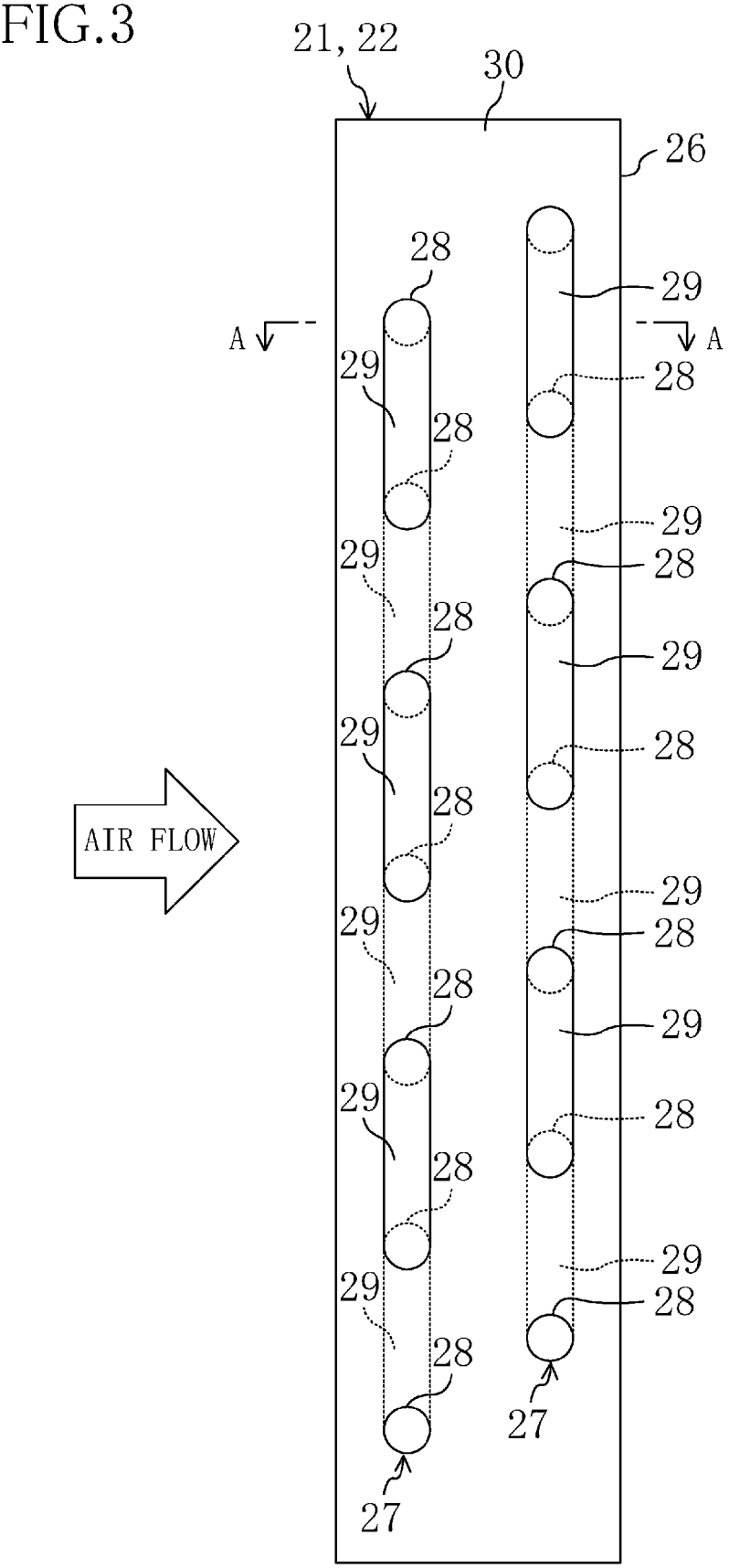
FIG. 3 is a side view of a heat exchanger unit forming the adsorption heat exchanger.

The adsorption heat exchanger (20) includes two subunits (21, 22) (see FIG. 2). Each of the subunits (21, 22) includes a heat exchanger body (25) which is a so-called "cross-fin type fin-and-tube heat exchanger" and an adsorbent layer (30) formed so as to cover a surface of the heat exchanger body (25) (see FIG. 4). In the adsorption heat exchanger (20), the two subunits (21, 22) are arranged so as to overlap each other. The first subunit (21) is positioned on an upstream side of a flow of air passing through the adsorption heat exchanger (20), and the second subunit (22) is positioned on a downstream side of the air flow.

The heat exchanger body (25) includes a cylindrical heat transfer pipe (27) which is a heat transfer member and a number of fins (26). Each of the fins (26) is an aluminum member formed in a rectangular plate shape. The fins (26) are provided parallel to each other in a state in which the fins (26) face each other, and are arranged in a line at regular interval. The heat transfer pipe (27) has a meander shape in which straight pipe portions (28) and U-shaped pipe portions (29) are formed so that the U-shaped pipe portions (29) are alternately formed on right and left sides of the heat exchanger body (25). The heat transfer pipe (27) is provided so that the straight pipe portions (28) penetrate the arranged fins (26). The straight pipe portions (28) of the heat transfer pipe (27) are bonded to the fins (26), and an outer circumferential surface of the heat transfer pipe (27) in the straight pipe portions (28) closely contacts the fins (26).

Figure 4:
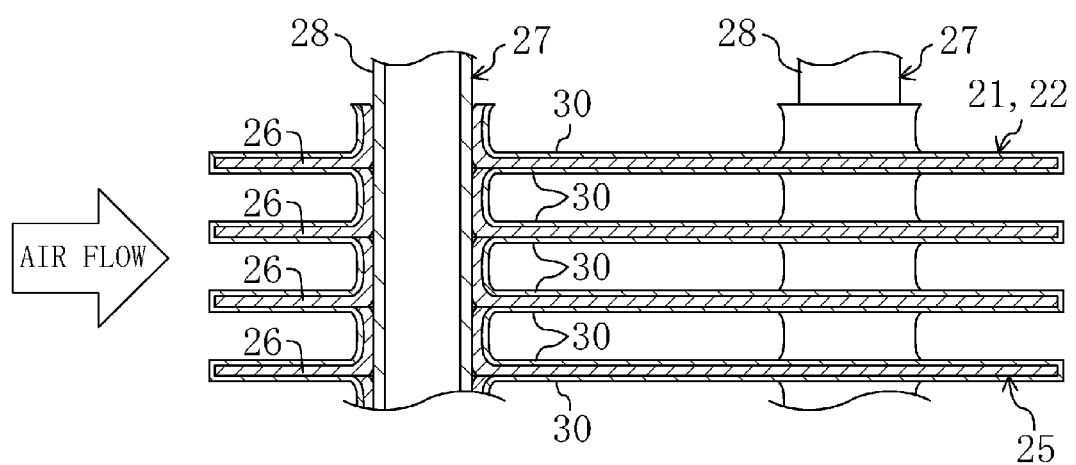
FIG. 4 is a cross-sectional view along an A-A line of FIG. 3.

As illustrated in FIG. 4, the adsorbent layer (30) is formed so as to cover both side surfaces of each of the fins (26). A thickness ta of the adsorbent layer (30) is about 0.25 mm. The thickness ta of the adsorbent layer (30) is preferably equal to or greater than 0.1 mm and equal to or less than 0.35 mm ($0.1 \text{ mm} \leq ta \leq 0.35 \text{ mm}$). The adsorbent layer (30) is formed not only on the surface of each of the fins (26) but also on a surface of part of the heat transfer pipe (27), which is not covered by the fins (26) (e.g., surfaces of the U-shaped pipe portions (29)). Note that a thickness of the adsorbent layer (30) formed in part of the heat exchanger body (25) other than the fins (26) may fall outside a range of equal to or greater than 0.1 mm and equal to or less than 0.35 mm.

Figure 6:
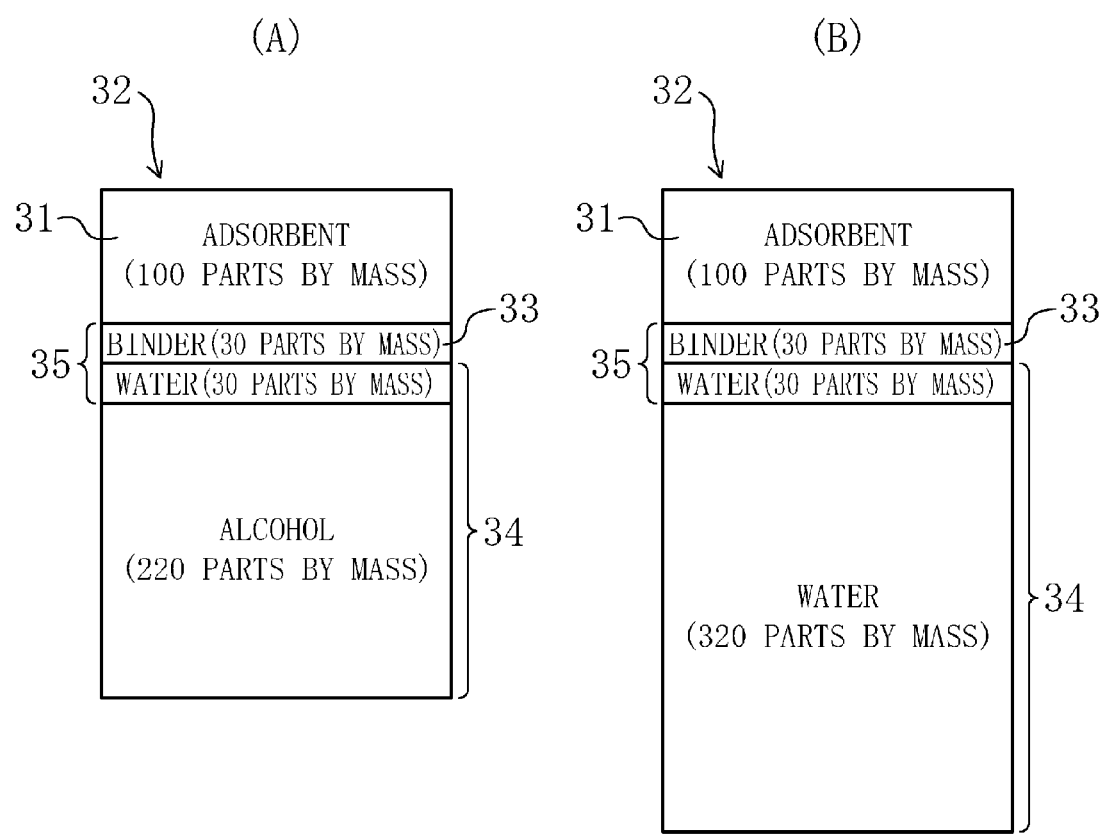
FIGS. 6(A) and (B) are diagrams illustrating a mixing ratio of adsorbent.

As illustrated in FIG. 6(A), the adsorbent layer (30) contains adsorbent (31) made of organic high-polymer material having a hygroscopic property. The adsorbent (31) is formed so as to have particles with an average particle size of e.g., about 50 μm. In the adsorbent (31), a plurality of high-polymer main chains having hydrophilic polar groups (hydrophilic groups) are cross-linked to each other, and the plurality of high-polymer main chains cross-linked to each other form a three-dimensional structure.

The particles of the adsorbent (31) are expanded by trapping water vapor (i.e., absorbing moisture). It is assumed that a mechanism for expanding the particles of the adsorbent (31) by the moisture absorption is as follows. That is, when the adsorbent (31) absorbs moisture, water vapor is adsorbed around the hydrophilic polar groups, and electrical force generated by reacting the hydrophilic polar groups with the water vapor acts on the high-polymer main chains. As a result, the high-polymer main chains are deformed. The water vapor enters a clearance between the deformed high-polymer main chains by capillary force, and then the three-dimensional structure including the plurality of high-polymer main chains is expanded due to the entering of the water vapor. As a result, a volume of the adsorbent (31) is increased.

In such a manner, both of a phenomenon in which water vapor is adsorbed to the adsorbent (31) and a phenomenon in which water vapor is absorbed by the adsorbent (31) are occurred in the adsorbent (31) contained in the adsorbent layer (30) of the present embodiment. That is, water vapor is collected by the adsorbent (31). Not only water vapor trapped by the adsorbent (31) is adsorbed to a surface of the three-dimensional structure including the plurality of high-polymer main chains cross-linked to each other, but also such water vapor enters the three-dimensional structure. As a result, a larger amount of water vapor is trapped by the adsorbent (31) as compared to, e.g., zeolite only adsorbing water vapor to a surface thereof.

The particles of the adsorbent (31) are contracted by dissipating water vapor (i.e., dissipating moisture). That is, when the adsorbent (31) dissipates moisture, an amount of water trapped in the clearance between the high-polymer main chains is decreased, and a shape of the three-dimensional structure including the plurality of high-polymer main chains is regained. As a result, the volume of the adsorbent (31) is decreased.

Operation of Humidity Control Device

An operation of the humidity control device will be described. The humidity control device performs the dehumidification operation and the humidification operation. In each of the dehumidification operation and the humidification operation, the humidity control device alternately repeats a first operation mode and a second operation mode for a predetermined period of time (e.g., at intervals of three minutes).

During the dehumidification operation, the humidity control device takes outdoor air (OA) as first air, and takes room air (RA) as second air. In addition, during the humidification operation, the humidity control device takes room air (RA) as the first air, and takes outdoor air (OA) as the second air.

<First Operation Mode>

First, the first operation mode will be described. In the first operation mode, the second air is sent to the first adsorption member (11), and the first air is sent to the second adsorption member (12). In the first operation mode, the four-way valve (14) is set to the first state in the refrigerant circuit (10). When the compressor (13) is in operation, refrigerant circulates to perform a refrigeration cycle in the refrigerant circuit (10). In such a state, in the refrigerant circuit (10), the first adsorption member (11) is operated as a condenser, and the second adsorption member (12) is operated as an evaporator.

Specifically, refrigerant discharged from the compressor (13) is condensed by dissipating heat in the first adsorption member (11). A pressure of the refrigerant condensed in the first adsorption member (11) is reduced when the refrigerant passes through the electric expansion valve (15), and then the refrigerant is evaporated by absorbing heat in the second adsorption member (12). The refrigerant evaporated in the second adsorption member (12) is sucked into the compressor (13), and is compressed in the compressor (13). Then, the refrigerant is re-discharged from the compressor (13).

In the first adsorption member (11) which is the adsorption heat exchanger (20), the adsorbent layer (30) formed on the surface of the fin (26) is heated by refrigerant flowing through the heat transfer pipe (27) to dissipate moisture, and water vapor dissipated from the adsorbent layer (30) is imparted to the second air. Similarly, in the second adsorption member (12) which is the adsorption heat exchanger (20), the adsorbent layer (30) formed on the surface of the fin (26) absorbs moisture from the first air, and heat generated thereupon is absorbed by refrigerant flowing through the heat transfer pipe (27).

During the dehumidification operation, the first air dehumidified in the second adsorption member (12) is supplied to a room, and the water vapor dissipated from the first adsorption member (11) is discharged outside the room together with the second air. On the other hand, during the humidification operation, the second air humidified in the first adsorption member (11) is supplied to the room, and the first air from which the water vapor is removed by the second adsorption member (12) is discharged outside the room.

<Second Operation Mode>

Next, a second operation mode will be described. In the second operation mode, the first air is sent to the first adsorption member (11), and the second air is sent to the second adsorption member (12). In the second operation mode, the four-way valve (14) is set to the second state in the refrigerant circuit (10). When the compressor (13) is in operation, refrigerant circulates to perform a refrigeration cycle in the refrigerant circuit (10). In such a state, in the refrigerant circuit (10), the second adsorption member (12) is operated as a condenser, and the first adsorption member (11) is operated as an evaporator.

Specifically, refrigerant discharged from the compressor (13) is condensed by dissipating heat in the second adsorption member (12). A pressure of the refrigerant condensed in the second adsorption member (12) is reduced when the refrigerant passes through the electric expansion valve (15), and then the refrigerant is evaporated by absorbing heat in the first adsorption member (11). The refrigerant evaporated in the first adsorption member (11) is sucked into the compressor (13), and is compressed in the compressor (13). Then, the refrigerant is re-discharged from the compressor (13).

In the second adsorption member (12) which is the adsorption heat exchanger (20), the adsorbent layer (30) formed on the surface of the fin (26) is heated by refrigerant flowing through the heat transfer pipe (27) to dissipate moisture, and water vapor dissipated from the adsorbent layer (30) is imparted to the second air. Similarly, in the first adsorption member (11) which is the adsorption heat exchanger (20), the adsorbent layer (30) formed on the surface of the fin (26) absorbs moisture from the first air, and heat generated thereupon is absorbed by refrigerant flowing through the heat transfer pipe (27).

During the dehumidification operation, the first air dehumidified in the first adsorption member (11) is supplied to a room, and the water vapor dissipated from the second adsorption member (12) is discharged outside the room together with the second air. On the other hand, during the humidification operation, the second air humidified in the second adsorption member (12) is supplied to the room, and the first air from which the water vapor is removed by the first adsorption member (11) is discharged outside the room.

Method for Manufacturing Adsorption Heat Exchanger

Next, a method for manufacturing the adsorption heat exchanger (20) will be described in detail with reference to FIG. 5. In the method for manufacturing the adsorption heat exchanger (20), a preparation step, an application step, and a drying step are performed. The application step and the drying step are alternately repeated.

First, the preparation step is a step for preparing slurry (32) mixed with adsorbent (31). As illustrated in, e.g., FIG. 6(A), a specific composition of the slurry (32) is adsorbent (31) of 100 parts by mass, a binder (33) of 30 parts by mass, water of 30 parts by mass, and alcohol of 220 parts by mass. That is, the water of 30 parts by mass and the alcohol of 220 parts by mass form a solvent (34). Note that the binder (33) and the water forming single water-based resin (35) are used. In addition, the water-based resin (35) may contain the binder (33), which is a solid content, of equal to or greater than 45% by mass (a water content of equal to or less than 45% by mass), i.e., may have a high concentration of the binder (33).

The alcohol is the organic solvent (34), and various types of alcohol can be used. Industrial alcohol which contains ethanol as a main component and to which plural types of alcohol other than ethanol are added is preferably used. Specifically, the alcohol is used, which contains ethanol of 85.5%, n-propyl alcohol of 9.8%, isopropyl alcohol of 4.8%, and water of 0.2%.

At the preparation step, the adsorbent (31) which is raw powder having many particles and the binder (33) are mixed with the solvent (34) to generate the slurry (32) which is raw liquid. The slurry (32) is formed by mixing the adsorbent (31), the binder (33), and the solvent (34) thoroughly and dispersing the adsorbent (31) and the binder (33) in the solvent (34).

The adsorbent (31) is formed so as to have a three-dimensional structure by cross-linking a plurality of high-polymer main chains having hydrophilic groups to each other. The adsorbent (31) adsorbs and absorbs water vapor when absorbing moisture from air. In the present embodiment, an average particle size of the adsorbent (31) is, e.g., about 50 μm.

The application step is a step for immersing a heat exchanger body (25) in the slurry (32). That is, at the application step, the heat exchanger body (25) which is a typical fin-and-tube heat exchanger is immersed in the slurry (32), thereby applying the slurry (32) to a surface of the heat exchanger body (25). Note that, in order to spread the slurry (32) into every part of the heat exchanger body (25), a process of immersing the heat exchanger body (25) in the slurry (32) and a process of pulling up the heat exchanger body (25) from the slurry (32) may be alternately performed at the application step, or a process of shaking the heat exchanger body (25) in the slurry (32) may be performed at the application step. Such processes ensure entering of the slurry (32) into a narrow space between fins (26), thereby ensuring adherence of the slurry (32) to the entire surface of the heat exchanger body (25).

In particular, the slurry (32) at the application step is slurry (32) containing the adsorbent (31) in a contracted state. The "contracted state" of the adsorbent (31) means a state in which the adsorbent (31) absorbs only the water forming the water-based resin (35), and a shape in which the particle size, e.g., a diameter of about 50 μm, of the adsorbent (31) in a raw powder state is substantially maintained.

At the drying step, the heat exchanger body (25) underwent the immersion step (i.e., the heat exchanger body (25), to the surface of which the slurry (32) is applied) is dried. At the drying step, the solvent (34) (the alcohol and the water) contained in the slurry (32) adhered to the heat exchanger body (25) is evaporated, and the particles of the adsorbent (31) and the binder (33) remain on the surface of the heat exchanger body (25). The particles of the adsorbent (31) are bonded to the surface of the heat exchanger body (25) and adjacent particles of the adsorbent (31) through the binder (33).

In the heat exchanger body (25) underwent the drying step, a thin adsorbent layer (30) is formed on the surface of the heat exchanger body (25). In the manufacturing method of the present embodiment, the immersion step and the drying step are repeated several to a couple dozens times in order to increase a thickness of the adsorbent layer (30) formed on the surface of the heat exchanger body (25). When the last drying step is finished, the manufacturing of the adsorption heat exchanger (20) is completed. In the manufactured adsorption heat exchanger (20), the adsorbent layer (30) having a thickness of about 0.25 mm is formed on the surface of the heat exchanger body (25).

A phenomenon in the adsorbent (31) and the binder (33) at the application step and the drying step will be described with reference to schematic views.

Figure 7:
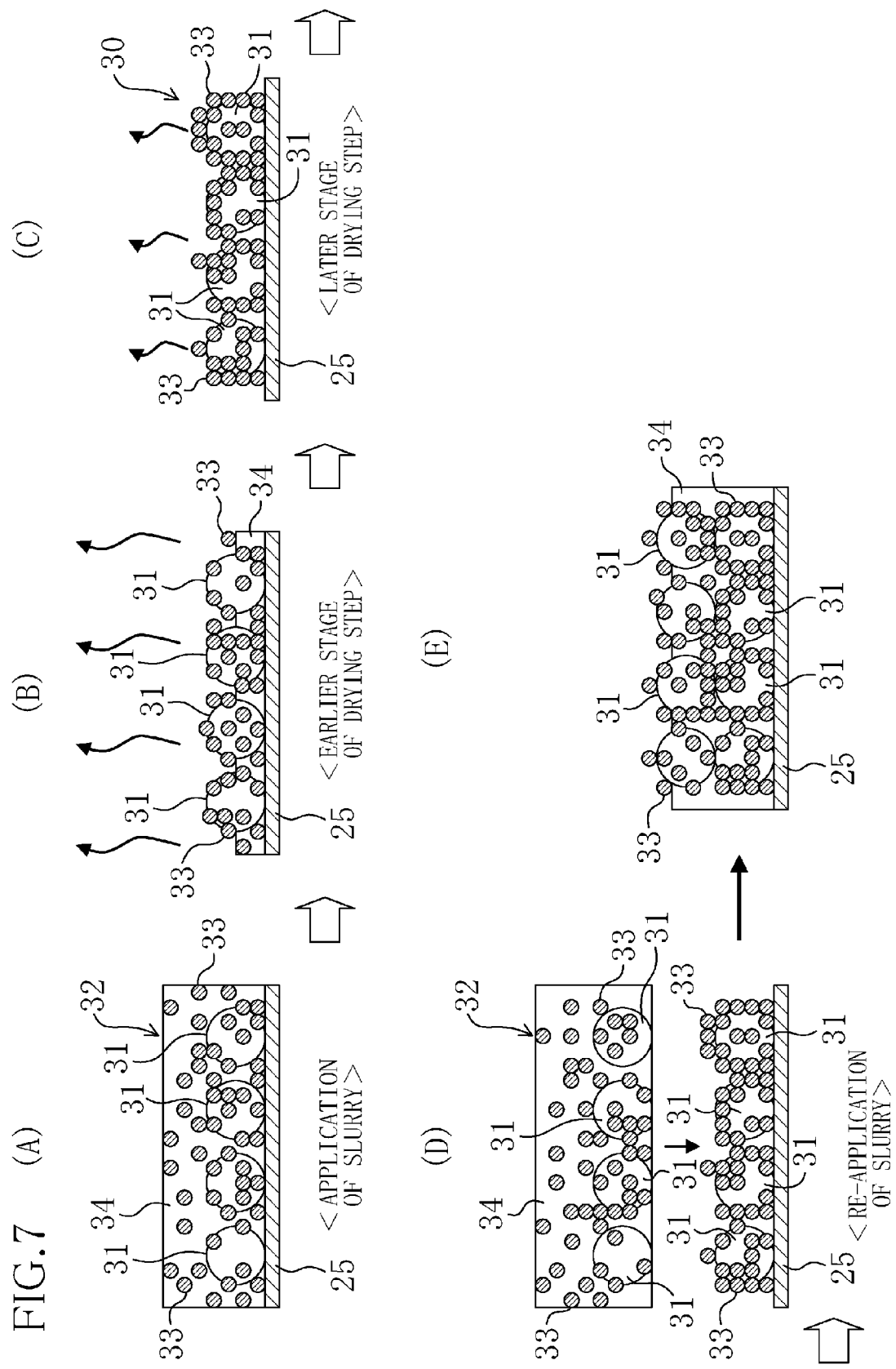
FIG. 7 is a schematic configuration diagram illustrating a phenomenon in adsorbent and a binder of slurry of the embodiment.

First, as illustrated in FIG. 7(A), when slurry (32) is applied to the heat exchanger body (25) which is base material, adsorbent (31) and a binder (33) are mixed with a solvent (34) containing alcohol as a main component, and particles of the adsorbent (31) are uniformly arranged. That is, the term "uniformly" means a mixing state in which the adsorbent (31), the binder (33), and the solvent (34) are mixed together thoroughly. Since the slurry (32) contains a slight amount of water in the foregoing state, the particles of the adsorbent (31) are less likely to be expanded, and the particle size (e.g., the diameter of 50 μm) of the adsorbent (31) in the raw powder state, i.e., in a dried state (contracted state) is substantially maintained.

Subsequently, when the process proceeds to the drying step, the water and the alcohol which are the solvent (34) are evaporated as illustrated in FIG. 7(B). At a later stage of the drying step, the particles of the adsorbent (31) are uniformly arranged on the surface of the heat exchanger body (25) as illustrated in FIG. 7(C), and an adsorbent layer (30) in which the adsorbent (31) is covered by the binder (33) is formed. A uniform arrangement state of the particles of the adsorbent (31) in the adsorbent layer (30) after the drying step is maintained at an arrangement state which is substantially the same as the state in the slurry (32).

Subsequently, the slurry (32) is re-applied. That is, as illustrated in FIG. 7(D), the slurry (32) is applied on the adsorbent layer (30) after the drying step. In such a state, as illustrated in FIG. 7(E), the dried adsorbent (31) is immersed in alcohol and water which are the solvent (34). Since the slurry (32) contains a slight amount of water in the foregoing state, the particles of the adsorbent (31) are less likely to be expanded, and the particle size of the adsorbent (31) in the raw powder state, i.e., in the dried state is substantially maintained. Thus, the particles of the adsorbent (31) are uniformly arranged.

Subsequently, the drying step is performed, and the application step and the drying step are repeated more than once. As a result, the adsorbent layer (30) having excellent dispersibility of the adsorbent (31) is formed on the surface of the heat exchanger body (25).

In the adsorbent layer (30), the adsorbent (31) is uniformly mixed across the entirety of the adsorbent layer (30). That is, the teen "uniformly" means a dispersion state in a planar direction, in which the adsorbent (31) is mixed with the solvent (34) and is dispersed in the solvent (34), and a stacking state in a thickness direction, in which the slurry (32) is re-applied and the adsorbent (31) is stacked.

Comparative Example of Adsorbent Layer (30)

A comparative example of the adsorbent layer (30) will be described. As illustrated in, e.g., FIG. 6(B), comparative slurry (32) of the comparative example contains adsorbent (31) of 100 parts by mass, a binder (33) of 30 parts by mass, water of 30 parts by mass, and water of 320 parts by mass as an additional solvent (34). Water is added to the binder (33) and the water which form water-based resin (35) in order to obtain predetermined viscosity, and an amount of the water which is the additional solvent (34) is 320 parts by mass considering an amount of water to be absorbed by the adsorbent (31). Thus, the water of 350 parts by mass forms a solvent (34).

A phenomenon in the adsorbent (31) and the binder (33) at an application step and a drying step of the comparative slurry (32) will be described.

Figure 8:
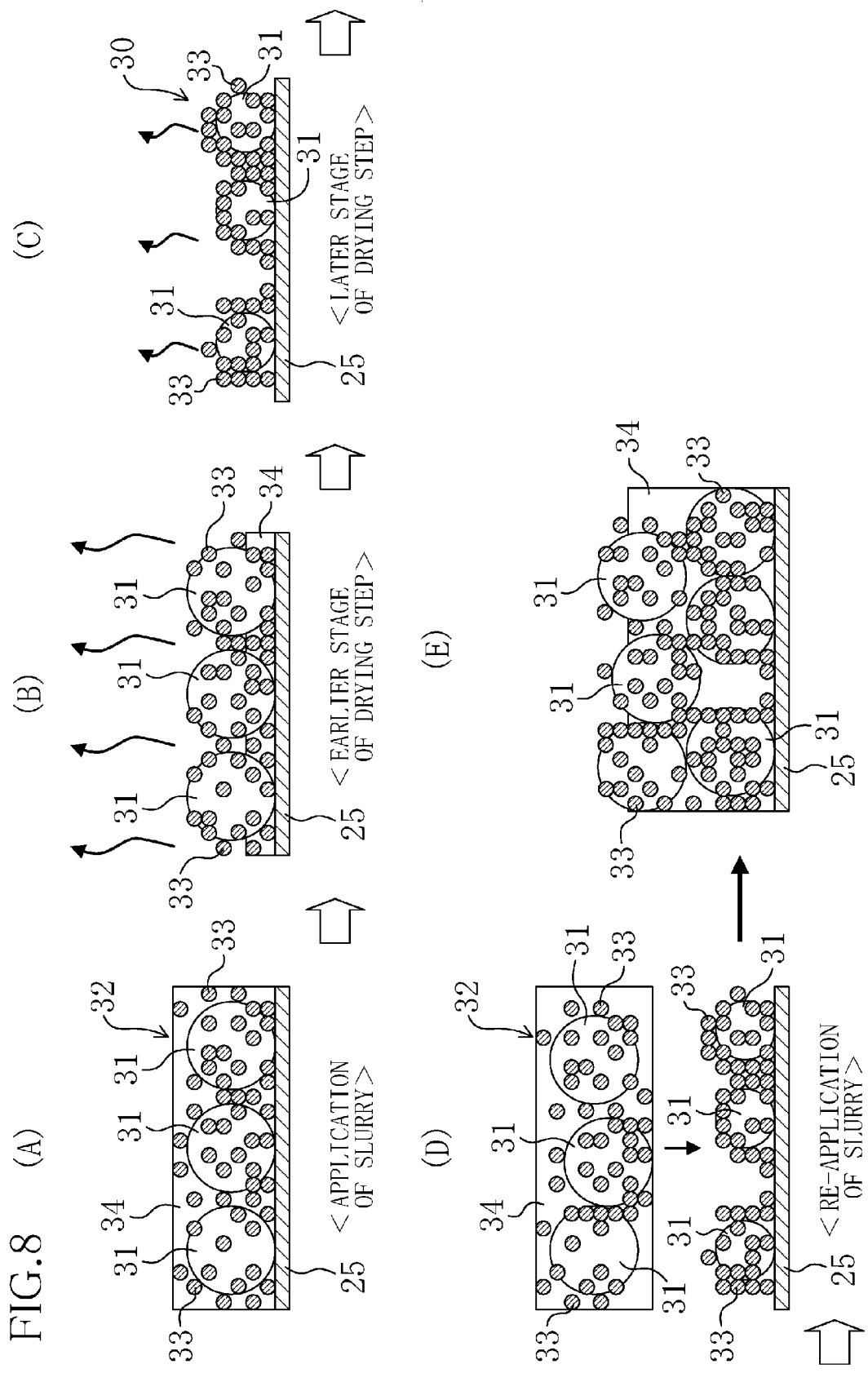
FIG. 8 is a schematic configuration diagram illustrating a phenomenon in adsorbent and a binder of slurry of a comparative example.

First, as illustrated in FIG. 8(A), when the comparative slurry (32) is applied to the heat exchanger body (25), the adsorbent (31) and the binder (33) are mixed with water (solvent (34)), and particles of the adsorbent (31) are uniformly arranged. That is, the particles of the adsorbent (31) are arranged in the dispersion state in which a solute is dissolved in the solvent (34). Since the slurry (32) contains an extremely large amount of water, the particles of the adsorbent (31) are expanded, thereby having, e.g., a particle size twice that in the raw powder state, i.e., in the dried state (contracted state).

Subsequently, when the process proceeds to the drying step, the water is evaporated as illustrated in FIG. 8(B). At the later stage of the drying step, the temporarily-expanded particles of the adsorbent (31) are contracted as illustrated in FIG. 8(C), and an adsorbent layer (30) in which the particles of the adsorbent (31) are non-uniformly arranged on the surface of the heat exchanger body (25) is formed.

Subsequently, the comparative slurry (32) is re-applied. That is, as illustrated in FIG. 8(D), the comparative slurry (32) is applied on the adsorbent layer (30) after the drying step. In such a state, as illustrated in FIG. 8(E), the dried adsorbent (31) is immersed in water which is the solvent (34). Since the slurry (32) contains an extremely large amount of water in the foregoing state, the temporarily-dried particles of the adsorbent (31) are re-expanded and are non-uniformly arranged.

Subsequently, the drying step is performed. Then, the application step and the drying step are repeated more than once. That is, the expansion and the contraction of the particles of the adsorbent (31) are repeated more than once, thereby forming the adsorbent layer (30).

Thus, at the later stage of the drying step illustrated in FIG. 8(C), cracking is caused due to the contraction of the particles of the adsorbent (31), resulting in peeling off the adsorbent (31). In addition, non-uniform coating is caused due to the contraction of the particles of the adsorbent (31), resulting in variation in performance. Further, binder coverage which is coverage of the adsorbent (31) by the binder (33) is increased, thereby degrading a water absorption performance.

In the re-application illustrated in FIG. 8(D), a clearance between the fins (26), i.e., between base materials is narrowed due to the expansion of the particles of the adsorbent (31), thereby reducing liquidity and causing clogs. In addition, since the binder (33) cannot withstand the expansion of the particles of the adsorbent (31), the binder (33) is peeled off. Further, since the adsorbent (31) absorbs a large amount of water, a drying time is increased.

At the application step, extra slurry (32) is dispersed and removed by centrifugal force. In such a state, since the expanded particles of the adsorbent (31) are heavy and large, the particles of the adsorbent (31) are likely to be dispersed. As a result, a mixing ratio of the adsorbent (31) to the adsorbent layer (30) is decreased, thereby increasing a mixing ratio of the binder (33) to the adsorbent layer (30). Thus, a moisture absorption performance of the adsorbent layer (30) is degraded.

In addition, since the expanded particles of the adsorbent (31) are heavy, the particles of the adsorbent (31) are likely to be precipitated in the slurry (32) and are non-uniformly arranged in the slurry (32).

As in the foregoing, according to the present invention, the solvent (34) substantially contains no water, thereby forming the excellent adsorbent layer (30). That is, alcohol is used for the solvent (34) to reduce the expansion and the contraction of the particles of the adsorbent (31) during the manufacturing process, thereby forming the adsorbent layer (30) in which the particles of the adsorbent (31) are arranged so that a state in which the slurry (32) is mixed is maintained.

Comparison between performance of the slurry (32) of the present invention and performance of the comparative slurry (32) shows results illustrated in FIG. 9.

That is, when cracking of a formed adsorbent layer (30) and dispersibility of a binder (33) (dispersibility of slurry (32)) are evaluated for slurry (32) such as slurry (32) formed by mixing water of 5 parts by mass with adsorbent (31) of 100 parts by mass and slurry (32) formed by mixing water of 70 parts by mass with adsorbent (31) of 100 parts by mass, the results are as illustrated in FIG. 9.

Specifically, no cracking is substantially caused in slurry (32) formed by mixing water of equal to or less than 50 parts by mass with adsorbent (31) of 100 parts by mass. In particular, no cracking is observed in slurry (32) formed by mixing water of equal to or less than 40 parts by mass with adsorbent (31) of 100 parts by mass.

On the other hand, good dispersibility of the binder (33) is obtained in slurry (32) formed by mixing water of equal to or greater than 10 parts by mass with adsorbent (31) of 100 parts by mass. In particular, excellent dispersibility of the binder (33) is obtained in slurry (32) formed by mixing water of equal to or greater than 20 parts by mass with adsorbent (31) of 100 parts by mass.

That is, if a water content in the slurry (32) is increased, the cracking is caused due to the expansion and the contraction of the particles of the adsorbent (31) as described above. On the other hand, if the water content in the slurry (32) is decreased, the binder (33) tends to have high viscosity, and therefore tends not to be mixed.

As described above, the water content in the slurry (32) is preferably equal to or greater than 10 parts by mass and equal to or less than 50 parts by mass for adsorbent (31) of 100 parts by mass. Further, the water content in the slurry (32) is more preferably equal to or greater than 20 parts by mass and equal to or less than 40 parts by mass for adsorbent (31) of 100 parts by mass. In particular, the water content in the slurry (32) is preferably 30 parts by mass for adsorbent (31) of 100 parts by mass.

Advantages of Embodiment

According to the adsorption heat exchanger (20) of the present embodiment, the adsorbent layer (30) without the cracking can be formed. In addition, the adsorbent layer (30) without the non-uniform coating can be formed, and therefore uniformity in hygroscopic performance can be realized across the entirety of the adsorbent layer (30). Further, the binder coverage which is the coverage of the adsorbent (31) by the binder (33) can be decreased, thereby improving the water absorption performance.

According to the adsorption heat exchanger (20), the narrowing of the clearance between the fins (26) can be prevented when the adsorbent layer (30) is formed, thereby preventing the clogs when the adsorbent layer (30) is formed. In addition, the expansion of the particles of the adsorbent (31) when the adsorbent layer (30) is formed is not caused, thereby ensuring prevention of the peeling off of the adsorbent layer (30).

When the slurry (32) is applied, the extra slurry (32) is dispersed and removed by the centrifugal force. In such a state, the adsorbent (31) is in the contracted state. Thus, the particles of the adsorbent (31) are light and small, and therefore are less likely to be dispersed. As a result, the mixing ratio of the adsorbent (31) to the adsorbent layer (30) is not decreased, thereby preventing degradation of the hygroscopic performance of the adsorbent layer (30).

In addition, since the particles of the adsorbent (31) are not heavy, the particles of the adsorbent (31) are less likely to be precipitated in the slurry (32), and uniform dispersion of the adsorbent (31) in the slurry (32) can be realized.

Since the water content in the slurry (32) is low, reduction of deformation of the adsorbent (31) when the adsorbent layer (30) is formed can be ensured.

According to the slurry (32), the adsorbent layer (30) in which the cracking is reduced is formed, and the binder (33) of the slurry (32) is easily mixed. Thus, the adsorbent layer (30) can be formed, in which the adsorbent (31) is uniformly dispersed.

According to the slurry (32), the reduction of the deformation of the adsorbent (31) when the adsorbent layer (30) is formed can be ensured.

According to the method for manufacturing the adsorption heat exchanger (20) in the present embodiment, the adsorbent layer (30) without the cracking can be formed. In addition, the adsorbent layer (30) without the non-uniform coating can be formed. Thus, the uniformity in hygroscopic performance can be realized across the entirety of the adsorbent layer (30). In addition, the binder coverage which is the coverage of the adsorbent (31) by the binder (33) can be decreased, thereby improving the water absorption performance.

Further, the narrowing of the clearance between the fins (26) can be prevented when the adsorbent layer (30) is formed, thereby preventing the clogs when the adsorbent layer (30) is formed. The expansion of the particles of the adsorbent (31) when the adsorbent layer (30) is formed is not caused, thereby ensuring the prevention of the peeling off of the adsorbent layer (30).

At the application step of the slurry (32), the extra slurry (32) is dispersed and removed by the centrifugal force. In such a state, the adsorbent (31) is in the contracted state. Thus, the particles of the adsorbent (31) are light and small, and therefore are less likely to be dispersed. As a result, the mixing ratio of the adsorbent (31) to the adsorbent layer (30) is not decreased, thereby preventing the degradation of the hygroscopic performance of the adsorbent layer (30).

Since the particles of the adsorbent (31) are not heavy, the particles of the adsorbent (31) are less likely to be precipitated in the slurry (32), and the uniform dispersion of the adsorbent (31) in the slurry (32) can be realized.

Variation of Embodiment

Figure 10:
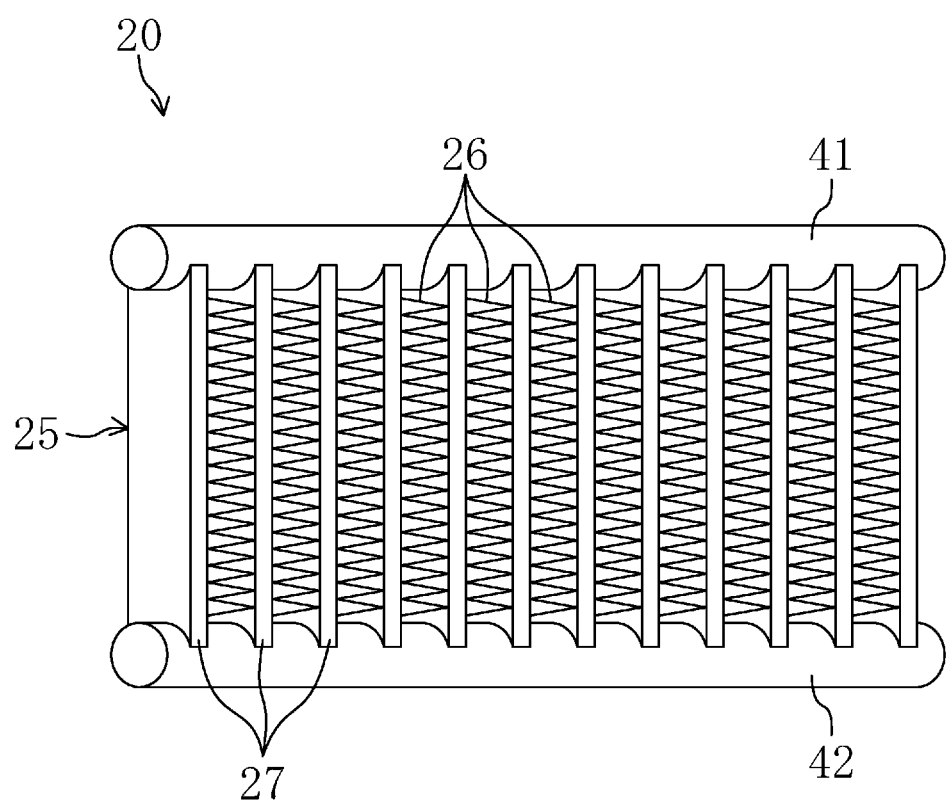
FIG. 10 is a schematic perspective view of a heat exchanger body forming an adsorption heat exchanger of a variation of the embodiment.

In the foregoing embodiment, the heat exchanger body (25) of the adsorption heat exchanger (20) may be a radiator type heat exchanger made of aluminum as illustrated in FIG. 10. The heat exchanger body (25) of the present variation includes a plurality of heat transfer pipes (27) made of aluminum and a plurality of fins (26) made of aluminum. In addition, two headers (41, 42) are provided in the heat exchanger body (25). In the adsorption heat exchanger (20) of the present variation, an adsorbent layer (30) is formed on surfaces of the heat transfer pipes (27), the fins (26), and the headers (41, 42) which faun the heat exchanger body (25).

Figure 11:
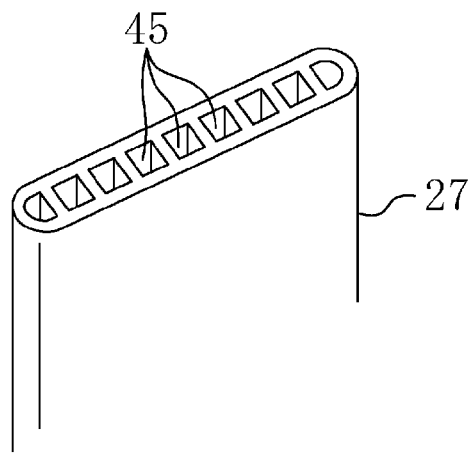
FIG. 11 is a schematic perspective view of a heat transfer pipe forming the heat exchanger body of the variation of the embodiment.

As illustrated in FIG. 11, the heat transfer pipe (27) has a flat oval cross section. In addition, in a single heat transfer pipe (27), a plurality of flow paths (45) extending in an axial direction of the heat transfer pipe (27) are formed in line. In the heat exchanger body (25), the plurality of heat transfer pipes (27) are vertically arranged at regular interval so as to face each other. In addition, one end of each of the heat transfer pipes (27) of the heat exchanger body (25) is connected to the first header (41), and the other end is connected to the second header (42).

Figure 12:
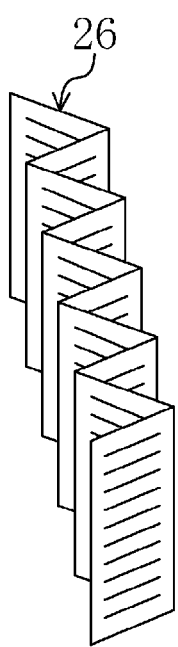
FIG. 12 is a schematic perspective view of a fin forming the heat exchanger body of the variation of the embodiment.

As illustrated in FIG. 12, the fin (26) is formed by folding an elongated thin plate into a corrugated shape, and is a so-called "corrugated fin (26)." The fin (26) is sandwiched between the heat transfer pipes (27), and is bonded to the heat transfer pipe (27) by, e.g., brazing.

In the foregoing embodiment, the adsorbent layer (30) is formed on the entire surface of the heat exchanger body (25). However, in the present invention, the adsorbent layer (30) may be formed on at least the surfaces of the fins (26) of the heat exchanger body (25).

Note that the foregoing embodiment has been set forth merely for purposes of preferred examples in nature, and is not intended to limit the scope, applications, and use of the invention.

INDUSTRIAL APPLICABILITY

As described above, the present invention is useful for the adsorption heat exchanger in which the adsorbent layer is formed on the surface of the heat exchanger body.

DESCRIPTION OF REFERENCE CHARACTERS

20 Adsorption Heat Exchanger
25 Heat Exchanger Body
26 Fin
27 Heat Transfer Pipe (Heat Transfer Member)
30 Adsorbent Layer
31 Adsorbent
32 Slurry
33 Binder
34 Solvent
35 Water-Based Resin

The invention claimed is:

1. A method for manufacturing a heat exchanger in which particles of adsorbent expanded by absorbing moisture and contracted by dissipating moisture are supported on at least a surface of a fin of a heat exchanger body, the method comprising:

preparing a slurry in which a binder and the adsorbent in a contracted state disperse in a solvent containing ethanol as a main component, the slurry being formed by mixing the adsorbent in a powder state, water-based resin containing the binder, water, and the solvent together;

applying the slurry to the at least the surface of the fin of the heat exchanger body; and drying the slurry, thereby forming an adsorbent layer containing the adsorbent on the at least the surface of the fin of the heat exchanger body, wherein the slurry contains water of 10-40 parts by mass for the adsorbent of 100 parts by mass, and a mass of the ethanol contained in the slurry is greater than a mass of each of the adsorbent, the binder and the water that are contained in the slurry.

2. The method of claim 1, wherein the slurry contains water of 20-40 parts by mass for the adsorbent of 100 parts by mass.

* * * * *